(12) United States Patent
Abdulla et al.

(10) Patent No.: US 12,537,030 B1
(45) Date of Patent: Jan. 27, 2026

(54) METHODS AND SYSTEMS FOR PLAYBACK OF AT LEAST ONE AUDIO DATA STREAM SYNCHRONIZED WITH PLAYBACK OF AT LEAST ONE DATA BUFFER

(71) Applicant: Mothlab LLC, Los Angeles, CA (US)

(72) Inventors: Ameen Essa Abdulla, Los Angeles, CA (US); Mykhailo Shevchuk, Kiev (UA)

( * ) Notice: Subject to any disclaimer, the term of this patent is extended or adjusted under 35 U.S.C. 154(b) by 0 days.

(21) Appl. No.: 19/294,077

(22) Filed: Aug. 7, 2025

(51) Int. Cl.
   *G11B 27/00* (2006.01)
   *G11B 27/031* (2006.01)
   *G11B 27/10* (2006.01)

(52) U.S. Cl.
   CPC ............ *G11B 27/10* (2013.01); *G11B 27/031* (2013.01)

(58) Field of Classification Search
   USPC ......................................................... 386/278
   See application file for complete search history.

(56) References Cited

U.S. PATENT DOCUMENTS

| | | | |
|---|---|---|---|
| 2017/0063692 A1* | 3/2017 | Roncero Izquierdo | ...................... H04N 21/4424 |
| 2017/0063959 A1* | 3/2017 | Roncero Izquierdo | ...................... H04L 65/70 |
| 2019/0312797 A1* | 10/2019 | Sen | .......................... H04L 65/80 |
| 2020/0128306 A1* | 4/2020 | Jackson | ................... H04L 69/28 |

* cited by examiner

*Primary Examiner* — Nigar Chowdhury
(74) *Attorney, Agent, or Firm* — Blueshift IP, LLC; Cynthia M. Gilbert

(57) ABSTRACT

A method for playback of at least one audio data stream synchronized with playback of at least one video buffer includes receiving, by a first application executed by a first computing device, from a second application, an audio data stream. The first application determines that the audio data stream includes a non-empty buffer comprising at least one signal and determines that a first amplitude of a first portion of the at least one signal in the non-empty buffer of the audio data stream is higher than a threshold level for the first amplitude. The first application removes, from the non-empty buffer, the first portion of the at least one signal in the non-empty buffer, based upon the first amplitude. After removal of the first portion of the at least one signal, the first application initiates synchronized playback of the audio data stream and of a video buffer.

18 Claims, 11 Drawing Sheets

METHODS AND SYSTEMS FOR PLAYBACK OF AT LEAST ONE AUDIO DATA STREAM SYNCHRONIZED WITH PLAYBACK OF AT LEAST ONE DATA BUFFER

BACKGROUND

The disclosure relates to methods and systems for synchronized playback of data. More particularly, the methods and systems described herein relate to functionality for playback of at least one audio data stream synchronized with playback of at least one data buffer, such as a video buffer or an audio buffer.

Conventionally, post-production applications for editing of media suffer from challenges in synchronizing playback of different types of media. Typically, different post-production applications are used for editing video than are used for editing audio. For example, users may execute digital audio workstations (DAWs) to record, edit, and produce audio; however, users may prefer to use different tools to record, edit, and produce video and then combine playback of the audio and the video data. However, when such users then attempt to use one of the applications to playback both the audio and the video data, the delay in transmitting the media from one application to the other typically results in a delay, even if the applications are executed by the same computing device. Solutions for collaboration across post-production applications typically rely on the use of Musical Instrument Digital Interface (MIDI) time codes to synchronize playback of audio data with playback of video data. However, even with the use of typical MIDI time codes, there may be a delay that impacts the level of synchronicity in playback.

Therefore, there is a need for a technological improvement to tools for post-production editing of media files such that transmitting media data between editing applications does not introduce a delay that prohibits synchronized playback of a combination of the media files.

BRIEF DESCRIPTION

In one aspect, a method for playback of at least one audio data stream synchronized with playback of at least one video buffer includes receiving, by a first application executed by a first computing device, from a second application executed by the first computing device, an audio data stream. The method includes determining, by the first application, that the audio data stream includes a non-empty buffer comprising at least one signal. The method includes determining, by the first application, that a first amplitude of a first portion of the at least one signal in the non-empty buffer of the audio data stream is higher than a threshold level for the first amplitude. The method includes removing, by the first application, from the non-empty buffer, the first portion of the at least one signal in the non-empty buffer, based upon the first amplitude. The method includes initiating, by the first application, after removal of the first portion of the at least one signal, synchronized playback of the audio data stream and of a video buffer.

In another aspect, a method for playback of at least one audio data stream synchronized with playback of at least one video buffer includes receiving, by a first application executed by a first computing device, from a second application executed by the first computing device, an audio data stream. The method includes determining, by the first application, that the audio data stream includes a non-empty buffer comprising at least one signal. The method includes determining, by the first application, that a first amplitude of a first portion of the at least one signal in the non-empty buffer of the audio data stream is lower than a threshold level for the first amplitude. The method includes removing, by the first application, from the non-empty buffer, the first portion of the at least one signal in the non-empty buffer, based upon the first amplitude. The method includes initiating, by the first application, after removal of the first portion of the at least one signal, synchronized playback of the audio data stream and of a video buffer.

In still another aspect, a method for playback of at least one audio data stream synchronized with playback of at least one audio buffer includes receiving, by a first application executed by a first computing device, from a second application executed by the first computing device, an audio data stream. The method includes determining, by the first application, that the audio data stream includes a non-empty buffer comprising at least one signal. The method includes determining, by the first application, that a first amplitude of a first portion of the at least one signal in the non-empty buffer of the audio data stream is higher than a threshold level for the first amplitude. The method includes removing, by the first application, from the non-empty buffer, the first portion of the at least one signal in the non-empty buffer, based upon the first amplitude. The method includes initiating, by the first application, after removal of the first portion of the at least one signal, synchronized playback of the audio data stream and of an audio buffer.

In yet another aspect, a method for playback of at least one audio data stream synchronized with playback of at least one audio buffer includes receiving, by a first application executed by a first computing device, from a second application executed by the first computing device, an audio data stream. The method includes determining, by the first application, that the audio data stream includes a non-empty buffer comprising at least one signal. The method includes determining, by the first application, that a first amplitude of a first portion of the at least one signal in the non-empty buffer of the audio data stream is lower than a threshold level for the first amplitude. The method includes removing, by the first application, from the non-empty buffer, the first portion of the at least one signal in the non-empty buffer, based upon the first amplitude. The method includes initiating, by the first application, after removal of the first portion of the at least one signal, synchronized playback of the audio data stream and of an audio buffer.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

The methods and systems described herein may provide functionality for playback of at least one audio data stream synchronized with playback of at least one buffer. The buffer may be a buffer that contains audio data. The buffer maybe may be a buffer that contains video data. The application for playback may be a post-production application for live streaming of audio and video data during real-time post-production editing sessions. In some embodiments, therefore, the methods and systems described herein provide functionality that forms a bridge between post-production applications enabling the streaming of audio and video data for real-time collaboration.

Solutions for collaboration across applications typically rely on the use of Musical Instrument Digital Interface (MIDI) time codes or on Linear Time Codes (LTC) to synchronize playback of audio data with playback of video data. However, even with the use of typical MIDI time codes, there may be a delay that impacts a level of synchronicity in playback; a delay of even 40 milliseconds may negatively impact the level of synchronicity. In contrast, the methods and systems described herein provide functionality for using ultrasonic signals added to, but not integrated with, audio tracks to synchronize playback of two different sources of media (e.g., an audio data stream with a video buffer or with a second source of audio) without introducing a delay.

Figure 1A:
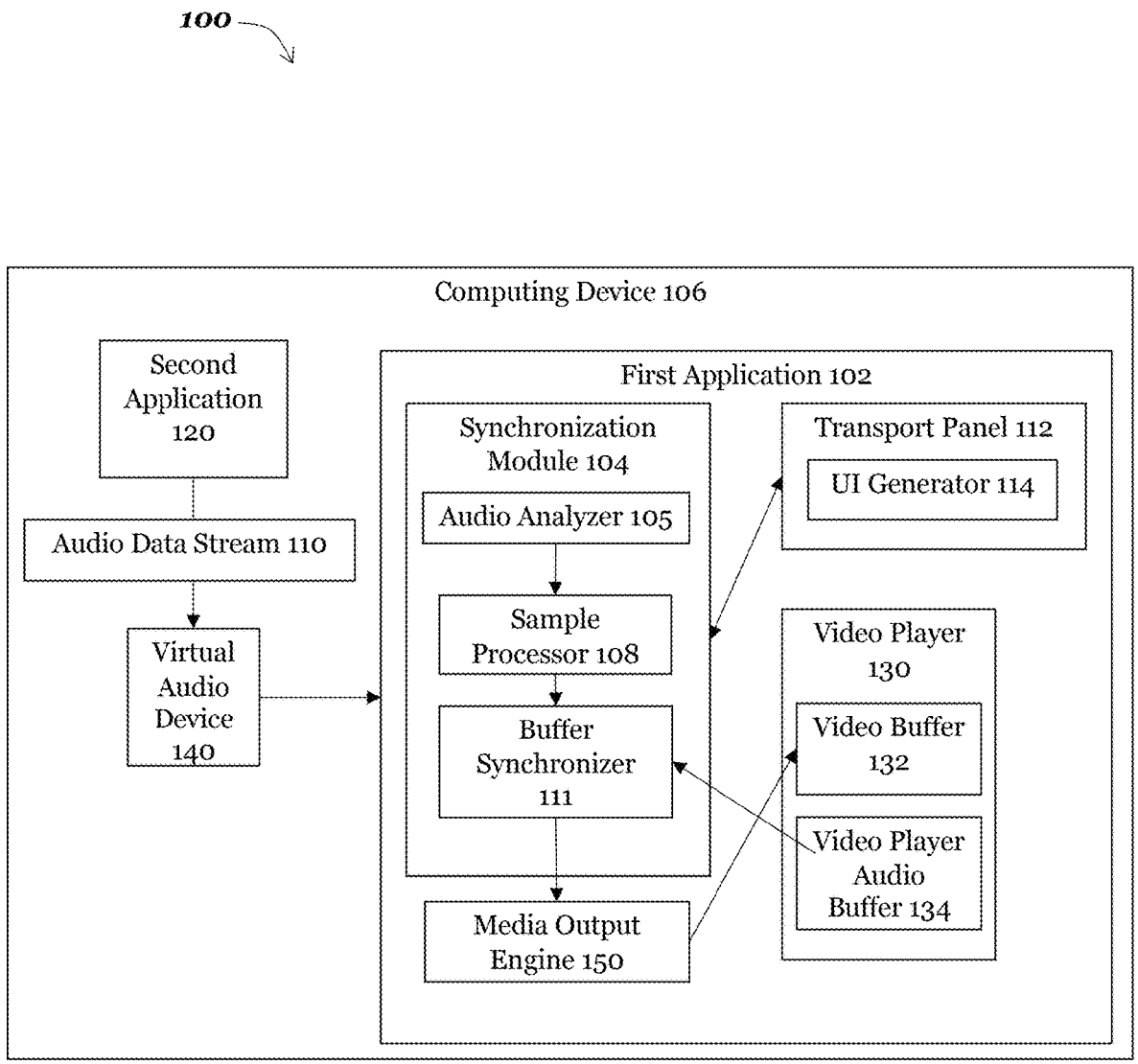
FIG. 1A is a block diagram depicting an embodiment of a system for playback of at least one audio data stream synchronized with playback of at least one buffer.

Referring now to FIG. 1A, a block diagram depicts one embodiment of a system for playback of at least one audio data stream synchronized with playback of at least one buffer. In brief overview, the system 100 includes a computing device 106, a first application 102, a synchronization module 104, an audio analyzer 105, a sample processor 108, a buffer synchronizer 111, an audio data stream 110, a transport panel 112, a user interface (UI) generator 114, a video player 130, a video buffer 132, a video player audio buffer 134, a second application 120, a virtual audio device 140, and a media output engine 150.

Figure 1B:
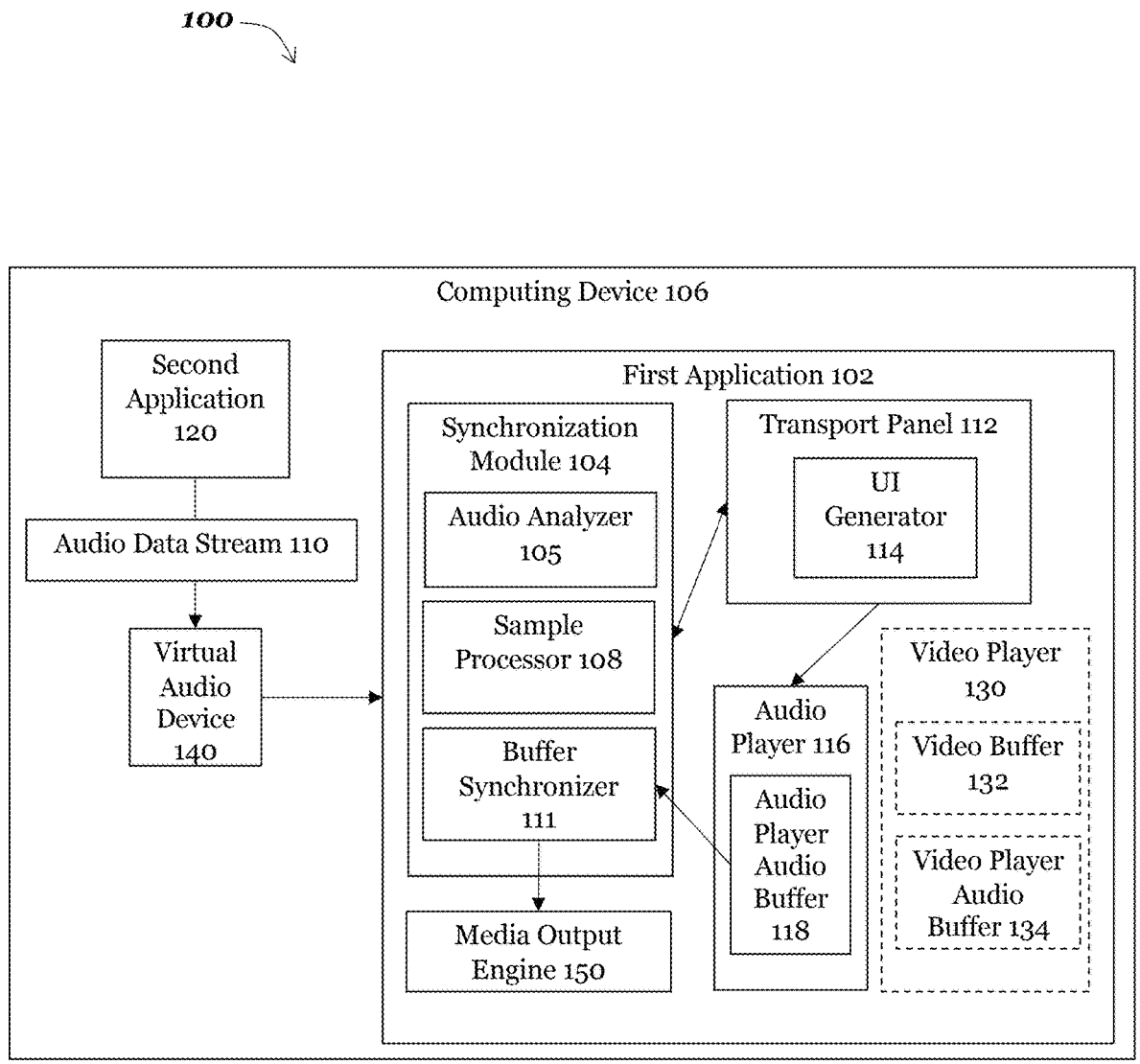
FIG. 1B is a block diagram depicting an embodiment of a system for playback of at least one audio data stream synchronized with playback of at least one buffer.

Referring ahead to FIG. 1B, a block diagram depicts one embodiment of a system 100 for playback of at least one audio data stream synchronized with playback of at least one buffer. In addition to, or instead of the video player 130 depicted in FIG. 1A, the system 100 may include an audio player 116 including an audio player audio buffer 118. The audio player 116 may be provided as a hardware component. The audio player 116 may be provided as a software component. The computing device 106 may execute the audio player 116, directly or indirectly. The audio player 116 may include an audio player audio buffer 118.

Figure 1C:
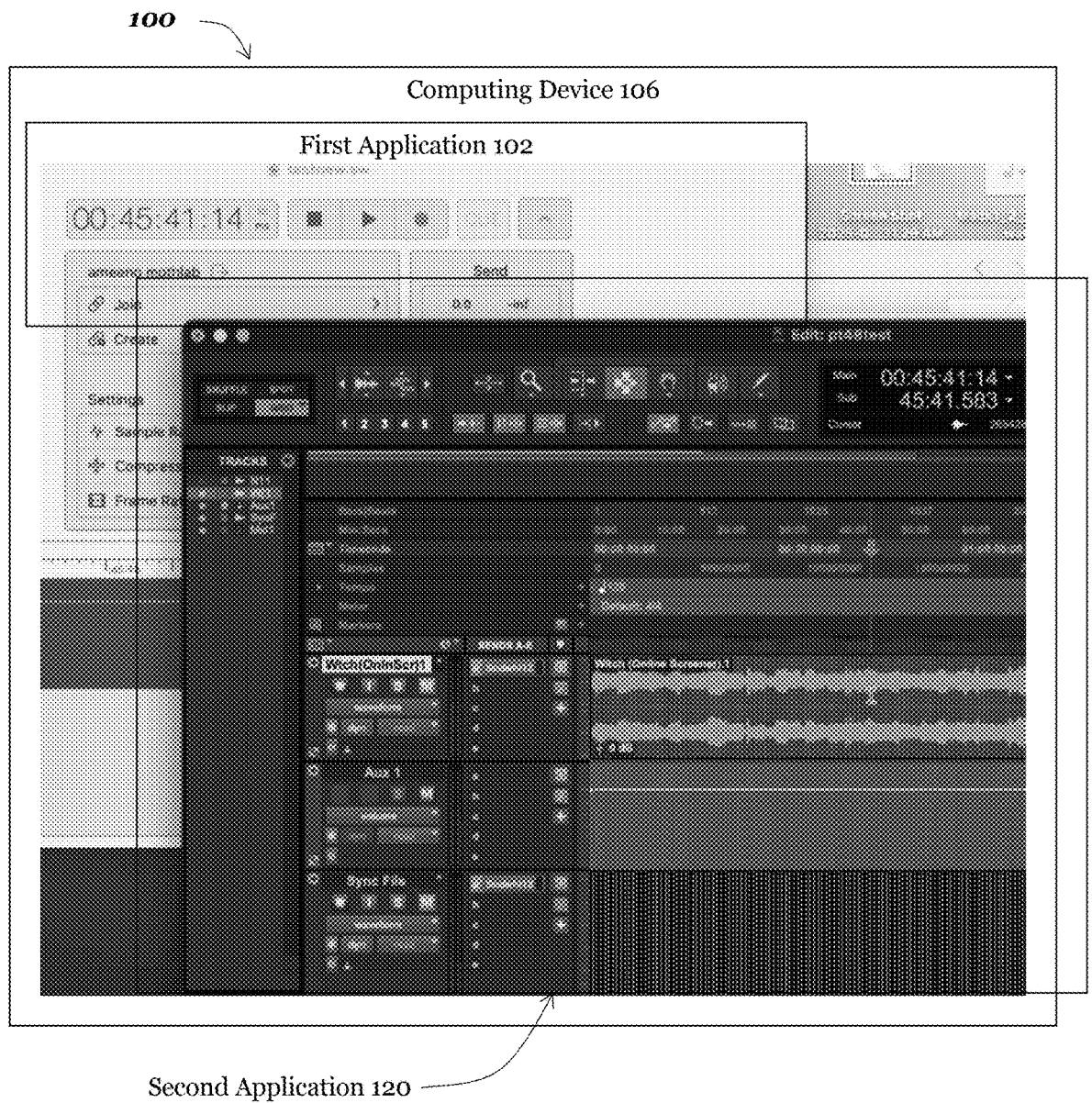
FIG. 1C is a block diagram depicting an embodiment of a system for playback of at least one audio data stream synchronized with playback of at least one buffer.

Referring ahead to FIG. 1C, a block diagram depicts one embodiment of the system 100. As shown in FIG. 1C, the audio data stream 110 provided by the second application 120 to the first application 102 may include one or more tracks. The audio data stream 110 may include a non-empty buffer. The audio data stream 110 may include a signal that has a pattern of amplitudes that the first application 102 may use to determine whether and/or when to initiate playback of the audio data stream 110. The audio data stream 110 may be a stream of audio data transmitted from the second application 120 to the first application 102. As will be understood by those of skill in the art, audio waves may be represented as time-varying signals composed of discrete samples measured in units of amplitudes at a sampling rate; the audio data stream 110 may therefore be or represent a stream of varying amplitude points at a sampling frequency.

Referring back to FIG. 1A, the video buffer 132 may be a data file containing video data accessible to the first application 102. As will be understood by those of skill in the art, the video buffer 132 may contain a sequence of frames that are displayed at a constant rate in order to display visual information. The video buffer 132 may be referred to as a video file. The video buffer 132 may be a file located on the computing device 106. The video buffer 132 may store video data retrieved from a file stored on the computing device 106. The video buffer 132 may be a file located on a second computing device (not shown), which the computing device 106 may access via one or more computer networks. The video buffer 132 may store video data retrieved from a file located on a second computing device (not shown), which the computing device 106 may access via one or more computer networks.

Figure 1D:
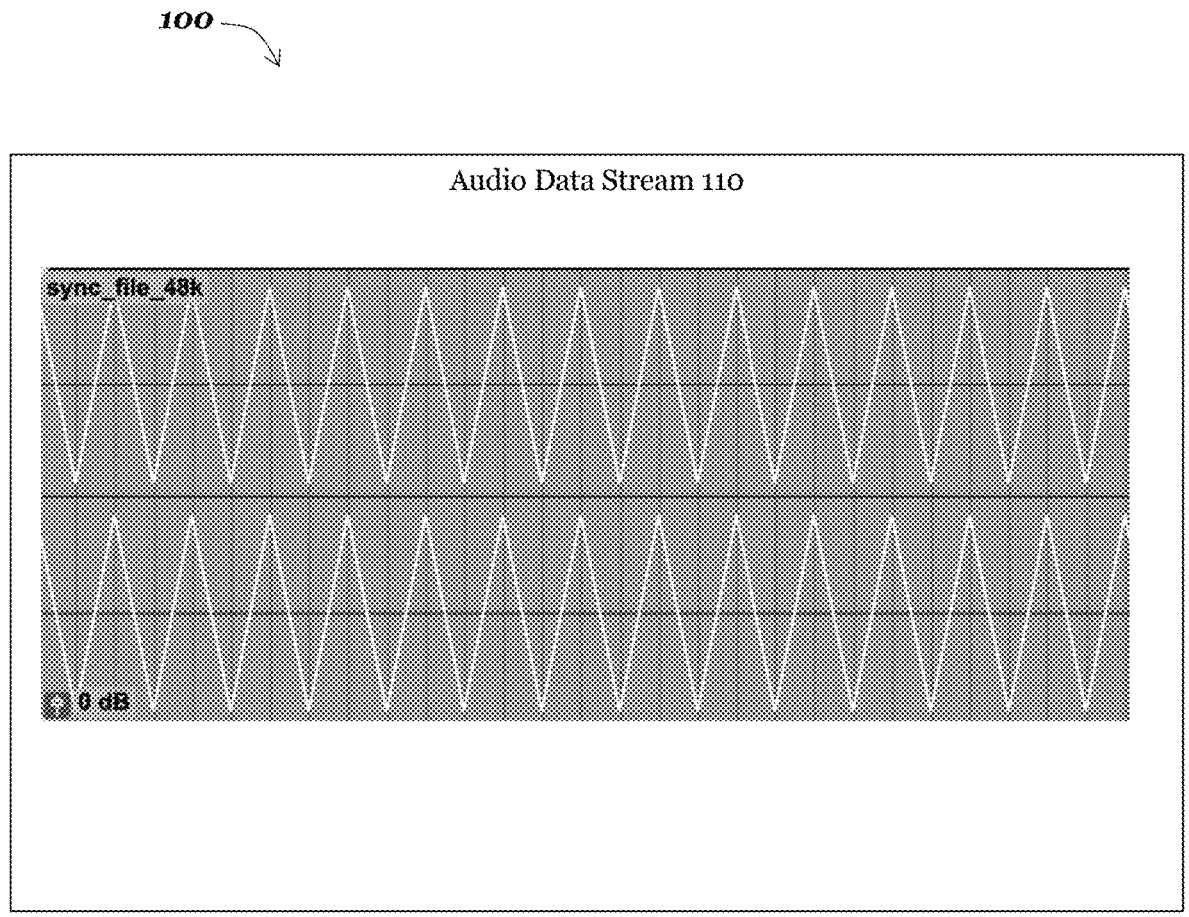
FIG. 1D is a block diagram depicting an embodiment of a signal in a non-empty buffer in a system for playback of at least one audio data stream synchronized with playback of at least one buffer.

Referring ahead to FIG. 1D, a block diagram depicts an embodiment of a representation of a signal in a non-empty buffer in a system for playback of at least one audio data stream synchronized with playback of at least one buffer. The audio data stream 110 may include the signal depicted that has a pattern of amplitudes. The first application 102 may use the signal to determine whether and/or when to initiate playback of the audio data stream 110. The vertical lines represent each sample intervals (which may also be referred to as portions) that the system 100 analyzes. The sizes of the portions may be based on the sampling frequency. In the embodiment depicted in FIG. 1D, a sampling frequency is 48000 samples/second, resulting in 48,000 portions to be analyzed. As will be discussed in greater detail below in connection with FIGS. 2-3, the system 100 may determine whether a portion contains an amplitude value that is higher than a threshold or an amplitude value that is lower than a threshold; determining that the signal does include a value that is higher or lower than the threshold value will result in the system 100 initiating playback and determining that values cycle between a value that is higher than the threshold and a value that is lower than the threshold will result in the system 100 maintaining synchronized playback.

Referring back to FIG. 1A, the first application 102 may provide functionality for analyzing and editing a video buffer 132. The first application 102 may provide functionality for analyzing and editing an audio data stream 110. The first application 102 may be provided as a software component. The first application 102 may be provided as a hardware component. The computing device 106 may execute the first application 102. The first application 102 may be an application for playing and streaming media for post-production collaboration. The first application 102 may synchronize audio editing and/or mixing applications to video buffers functioning as external video players. The first application 102 may also combine and then stream audio and video data together, allowing users to view and hear the audiovisual data in collaboration settings including, without limitation, settings in which users view and edit in real-time. The first application 102 may also receive data from other instances of the application 102 executing on other computing devices 106.

The second application 120 may provide functionality for recording, editing, and/or producing audio, such as the audio data stream 110. The second application 120 may provide functionality for combining (or mixing) a plurality of tracks of audio into a single audio data stream. The second application 120 may be provided as a software component. The computing device 106 may execute the second application 120. The second application 120 may be a digital audio workstation (DAW).

The virtual audio device 140 may be provided as a plug-in to an operating system of the computing device 106. The virtual audio device 140 may be an application executed by the computing device 106. The virtual audio device 140 may provide functionality for transferring the audio data stream 110 between applications on the same computing device 106; for example, the virtual audio device 140 may transfer the audio data stream 110 from the second application 120 to the first application 102. The virtual audio device 140 may be accessed by both the second application 120 and the synchronization module 104 within the first application 102.

The synchronization module 104 may be provided as a hardware component. The synchronization module 104 may be provided as a software component. The computing device 106 may execute the synchronization module 104. The first application 102 may execute the synchronization module 104. The synchronization module 104 may be in communication, directly or indirectly, with the transport panel 112.

The audio analyzer 105 may be provided as a hardware component. The audio analyzer 105 may be provided as a software component. The synchronization module 104 may execute the audio analyzer 105. The audio analyzer 105 may include functionality for determining whether an audio data stream 110 includes a non-empty buffer. The audio analyzer 105 may include functionality for analyzing a non-empty buffer in the audio data stream 110 and for identifying characteristics of the audio data stream 110. The audio analyzer 105 may inspect audio data. The audio analyzer 105 may process audio data. The audio analyzer 105 may identify one or more characteristics of the audio data, such as, without limitation, amplitude, frequency, distortion, and noise. In one embodiment, the audio analyzer 105 may be a system, module, or procedure for evaluating audio signals (digital or analog) in order to identify the presence of a signal within the audio data stream 110, assess amplitude properties of the signal when the signal is identified (such as, without limitation, peak or root mean square (RMS) values). The audio analyzer 105 may perform further analyses including, without limitation, frequency evaluation, silence detection, and/or signal quality verification. The audio analyzer 105 may perform one or more analyses on each sample in an audio data stream 110, where the samples are determined by a sampling frequency. The audio analyzer 105 may determine a floating point value at each sample interval specified by the sampling frequency. As will be understood by those of skill in the art, floating point values may represent amplitude in digital audio; the value of zero may be empty or silent and values such as +5 or −5 may represent maximum and minimum values.

The sample processor 108 may be provided as a hardware component. The sample processor 108 may be provided as a software component. The synchronization module 104 may execute the sample processor 108. The sample processor 108 may execute functionality for editing one or more portions of an audio data stream 110. The sample processor 108 may be a component or module that operates on individual digital audio samples, either in real time or in batch mode, to perform one or more transformations, evaluations, and/or modifications based on predefined criteria including, without limitation, amplitude, threshold, timing or signal characteristics.

The transport panel 112 may be provided as a hardware component. The transport panel 112 may be provided as a software component. The computing device 106 may execute the transport panel 112. The first application 102 may execute the transport panel 112. The transport panel 112 may be in communication, directly or indirectly, with the synchronization module 104. The transport panel 112 may execute the user interface (UI) generator 114. The transport panel 112 may execute the video player 130. The transport panel 112 may execute the audio player 116.

The UI generator 114 may be provided as a hardware component. The UI generator 114 may be provided as a software component. The computing device 106 may execute the UI generator 114, directly or indirectly. The UI generator 114 may execute functionality for generating a user interface displayed by the computing device 106 with which a user of the first application 102 may edit the video buffer 132. The UI generator 114 may execute functionality for generating a user interface displayed by the computing device 106 with which a user of the first application 102 may identify the video buffer 132 and the audio data stream 110 for synchronized playback. The UI generator 114 may receive user input and transmit the user input to another component in the system 100. In some embodiments, the UI generator 114 may transmit received user input to different applications. As one example, in some embodiments, the UI generator 114 may initiate playback on software using MIDI machine control.

The video player 130 may be provided as a hardware component. The video player 130 may be provided as a software component. The computing device 106 may execute the video player 130, directly or indirectly. The video player 130 may execute functionality initiating playback of the video buffer 132. The video player 130 may include a video player audio buffer 134.

The system 100 may include a buffer synchronizer 111. The buffer synchronizer 111 may be provided as a hardware component. The buffer synchronizer 111 may be provided as a software component. The synchronization module 104 may execute the buffer synchronizer 111. The buffer synchronizer 111 may receive audio data from the audio player audio buffer 118. The buffer synchronizer 111 may receive audio data from the video player audio buffer 134. The buffer synchronizer 111 may receive audio data from the sample processor 108. The buffer synchronizer 111 may store the audio data stream 110 received from the second application 120. The buffer synchronizer 111 may execute functionality for determining when data has arrived from the transport panel 112. The buffer synchronizer 111 may execute functionality for determining when synchronization is established after arrival of the audio buffers and for passing the synchronized output to the media output engine 150. The buffer synchronizer 111 may align these buffers according to starting sample position, resolves timing differences, and outputs a time-synchronized stream of audio buffers for use by the media output engine 150. The buffer synchronizer 111 may output a synchronized audio stream for playback. The buffer synchronizer 111 may output a synchronized audio stream for processing by the media output engine 150.

The system 100 may include the media output engine 150. The media output engine 150 may be provided as a hardware component. The media output engine 150 may be provided as a software component. The first application 102 may execute the media output engine 150. The media output engine 150 receives data from the synchronized audio buffers and the audio data stream 110 and plays back these synchronized elements to the final output while initiating the video player 130 to draw the video buffer with matching timestamps. The media output engine 150 may receive data from the time-aligned audio buffers from a buffer synchronizer, each originating from separate sources. The media output engine 150 delivers the data from within buffers to an audio output device and maintains a playback timeline based on audio presentation timestamps. The media output engine 150 may coordinate with an external video player providing current playback time for timestamp-based video frame drawing, thereby ensuring synchronized audio-visual output.

Although, for ease of discussion, the first application 102, the synchronization module 104, the audio analyzer 105, the sample processor 108, the buffer synchronizer 111, the transport panel 112, the UI generator 114, the video player 130, and the media output engine 150 are described in FIG. 1A as separate modules, it should be understood that this does not restrict the architecture to a particular implementation. For instance, these components may be encompassed by a single circuit or software function or, alternatively, distributed across a plurality of computing devices.

Figure 2:
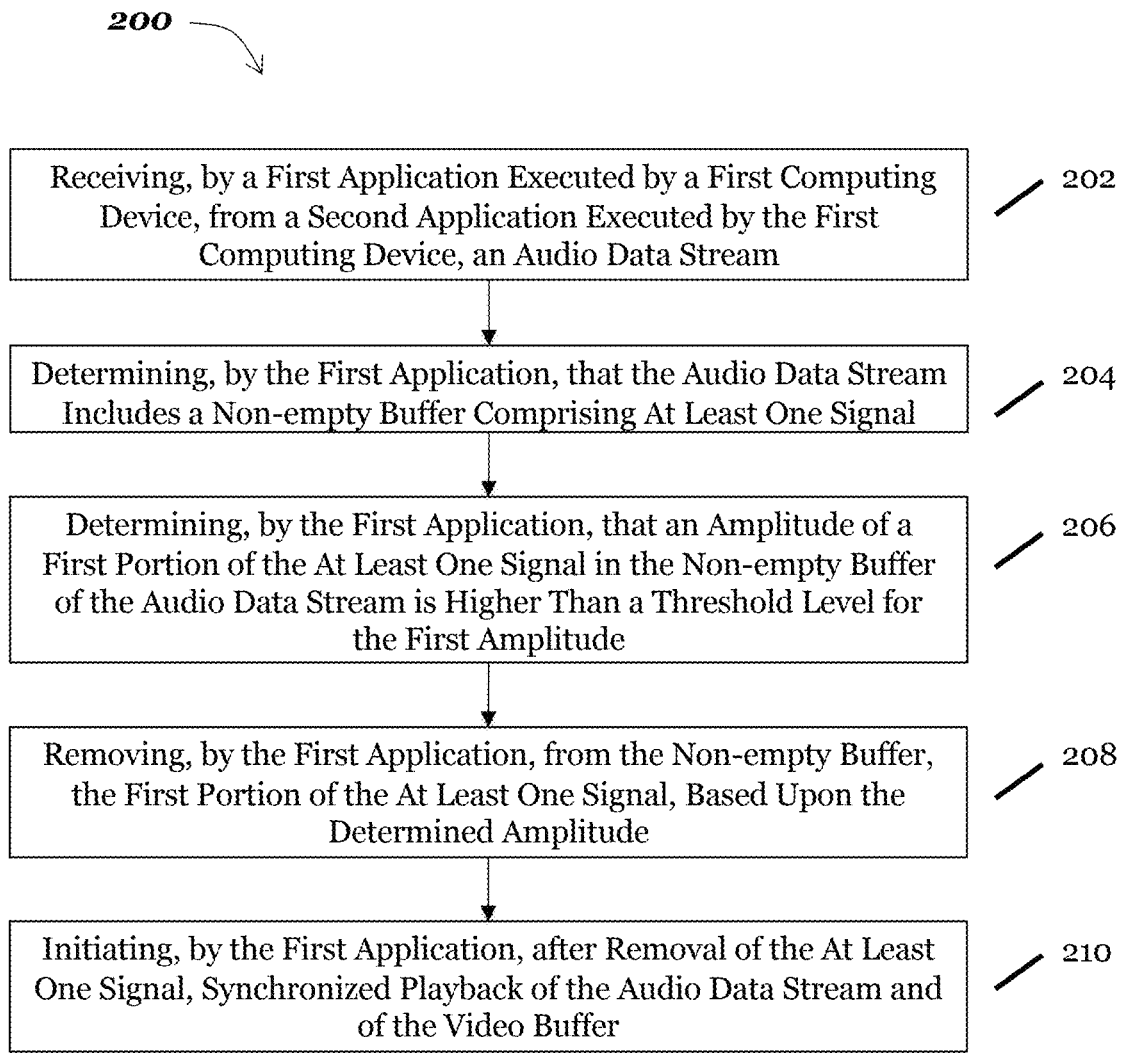
FIG. 2 is a flow diagram depicting an embodiment of a method for playback of at least one audio data stream synchronized with playback of at least one video buffer.

Referring now to FIG. 2, in brief overview, a block diagram depicts one embodiment of a method 200 for playback of at least one audio data stream synchronized with playback of at least one video buffer. The method 200 includes receiving, by a first application executed by a first computing device, from a second application executed by the first computing device, an audio data stream (202). The method includes determining, by the first application, that the audio data stream includes a non-empty buffer comprising at least one signal (204). The method includes determining, by the first application, that a first amplitude of a first portion of the at least one signal in the non-empty buffer of the audio data stream is higher than a threshold level for the first amplitude (206). The method includes removing, by the first application, from the non-empty buffer, the first portion of the at least one signal in the non-empty buffer, based upon the first amplitude (208). The method includes initiating, by the first application, after removal of the first portion of the at least one signal, synchronized playback of the audio data stream and of a video buffer (210).

Referring now to FIG. 2, in greater detail and in connection with FIG. 1, the method 200 includes receiving, by a first application executed by a first computing device, from a second application executed by the first computing device, an audio data stream (202). The first application 102 may receive the audio data stream 110 from the second application 120. The first application 102 may receive the audio data stream 110 from the virtual audio device 140.

The method includes determining, by the first application, that the audio data stream includes a non-empty buffer comprising at least one signal (204). The audio analyzer 105 may analyze the audio data stream 110 to determine that the audio data stream 110 includes a non-empty buffer. The audio analyzer 105 may analyze the audio data stream 110 to determine that the audio data stream 110 includes a non-empty buffer comprising the at least one signal. The non-empty buffer may include a plurality of amplitude values.

The audio analyzer 105 may analyze each sample in the audio data stream 110 to determine 32-bit floating point values at each sample interval. These 32-bit floating-point values represent amplitude in digital audio; the value of zero is empty or silence; therefore, a non-empty buffer would contain a value other than zero.

The method includes determining, by the first application, that a first amplitude of a first portion of the at least one signal in the non-empty buffer of the audio data stream is higher than a threshold level for the first amplitude (206). The audio analyzer 105 may analyze the audio data stream 110 to determine the amplitude of the first portion of the at least one signal. The audio analyzer 105 may be configured to include a threshold level for the first amplitude and may execute functionality for analyzing wavelengths to determine amplitude. As will be understood by those of skill in the art, the audio analyzer 105 may analyze data that represents the signal and that specifies a voltage level associated with the first portion of the at least one signal to determine the amplitude. Alternatively, or in addition to analyzing such data, the audio analyzer 105 may analyze data representing the signal and comprising floating point values corresponding to audio amplitude at each sample interval to determine amplitude characteristics of the first portion of the at least one signal.

Based upon determining that the first amplitude is higher than the threshold level for the first amplitude, the first application 102 may instruct the transport panel 112 to transmit data from the video player audio buffer 132 to the buffer synchronizer 111.

The method includes removing, by the first application, from the non-empty buffer, the first portion of the at least one signal in the non-empty buffer, based upon the first amplitude (208). The sample processor 108 may remove the first portion of the at least one signal from the non-empty buffer. By way of example, the sample processor 108 may modify a value in the non-empty buffer to be zero.

After the audio analyzer 105 determines values in each sample interval and decides that the first amplitude is above the threshold level for the first amplitude, the sample processor 108 may then remove from the non-empty buffer the first portion of the at least one signal. By way of example and without limitation, the sample processor 108 may subtract 5 from the value in the non-empty buffer; for example, if the total value in the non-empty buffer is 5.023, the sample processor 108 may replace 5.023 with 0.023 in the non-empty buffer. Continuing with this example, after the audio analyzer 105 determines values in each sample interval and decides that the first amplitude is below the threshold level for the first amplitude, the sample processor 108 may then remove from the non-empty buffer the first portion of the at least one signal; the sample processor 108 may determine the absolute value of the amplitude, subtract 5 from the value in the non-empty buffer and then multiply by −1; for example, if the total value in the non-empty buffer is −5.023, the sample processor 108 may take the absolute value of that amplitude, subtract 5, multiply by −1, and replace −5.023 with −0.023 in the non-empty buffer.

The method includes initiating, by the first application, after removal of the first portion of the at least one signal, synchronized playback of the audio data stream and of a video buffer (210). The first application 102 may initiate the synchronized playback.

The first application 102 may automatically (i.e., without human intervention) initiate synchronized playback of the audio data stream 110 and the video buffer 132. In one embodiment, the first application 102 determines that a first portion of the signal includes a first amplitude that is higher than a threshold level of amplitude and, based upon that determination, the first application 102 may remove at least a portion of the signal; the determination of the high amplitude of the portion of the signal may trigger the first application 102 to initiate playback for a first portion of the audio data stream 110 and, simultaneously, to initiate playback of the video buffer 132.

In some embodiments, the first application 102 may receive an instruction to initiate synchronized playback. For example, the UI generator 114 may determine that the system 100 has received input to a generated user interface, the input including the instruction to initiate synchronized playback. The first application 102 may receive an instruction to initiate synchronized playback from a user of the computing device 106. The first application 102 may receive an instruction to initiate synchronized playback from a second computing device (not shown). Alternatively, the first application 102 may receive an instruction to initiate synchronized playback upon completion of the removal of the portion of the signal.

The first application 102 may initiate the synchronized playback between the audio data stream received from the second application 120 and a video buffer 132 stored on the computing device 106. The first application 102 may initiate the synchronized playback between the audio data stream received from the second application 120 and a video buffer 132 stored on a second computing device (not shown).

The first application 102 may transmit an instruction to the video player 130 to begin playing the video buffer 132. For example, the first application 102 may transmit an instruction to the video player 130 to begin playing the video buffer 132 upon removal of at least one portion of the audio data stream 110 by the synchronization module 104. As another example, the video buffer 132 may begin playing when the buffers have been synchronized in the buffer synchronizer and begin to play in the media output engine 150.

The first application 102 may transmit to a second computing device an audiovisual data stream providing synchronized playback of the audio data stream and of the video buffer. In one embodiment, once the system 100 synchronizes the received audio data stream and the content stored in the video buffer, the system 100 may stream the combined audiovisual data to the second computing device. In another embodiment, the first application 102 executes on the computing device 106 and the second application 120 executes on a second computing device (not shown); the first application 102 may receive the audio data stream over a computer network and provide synchronized playback of the audio data stream and the video buffer.

After initiating playback, the first application 102 may proceed to analyze another portion of the audio data stream 110 to determine whether to maintain playback. Therefore, the first application 102 may determine that a second amplitude of a second portion of the at least one signal in the non-empty buffer of the audio data stream is lower than a threshold level of amplitude and the first application may determine that a frequency of the at least one signal in the non-empty buffer of the audio data stream is the same as (e.g., matches) a predetermined frequency. The first application 102 may then remove, from the non-empty buffer, the second portion of the at least one signal, based upon the determined second amplitude and the determined frequency and, upon completion of the removal, the first application 102 may maintain the synchronized playback of the audio data stream and of the video buffer; for example, the first application 102 may send an instruction to each of the video player 130 and the audio player 116 to continue playback.

If the first application 102 determines that a first portion of the signal includes a first amplitude that is higher than a threshold level of amplitude and that the first portion of the signal is followed by the second portion of the signal in which a second amplitude is lower than the threshold level of amplitude and the signal has a frequency that is the same as (e.g., matches) a predetermined frequency, the first application 102 may determine that the signal has a set of characteristics matching a predefined signal and, based upon that determination, the first application may remove at least a portion of the signal. By way of example, the first application 102 may determine that the signal having these characteristics is an ultrasonic signal (i.e., a signal that is not conventionally audible to humans) and may be removed without interfering with the playback of the audio data stream 110.

In some embodiments, when the buffer synchronizer 111 receives the data from the video player audio buffer 132 and receives the data from the sample processor 108, the buffer synchronizer 111 aligns the data according to their start positions at the first sample interval and transmits to the media output engine 150 the unified, time-synchronized audio data for playback. The media output engine 150 processes the time-synchronized audio buffers for playback. The media output data engine 150 delivers the time-synchronized audio buffers to an audio output device for playback. The media output data engine 150 maintains a playback timeline based on audio presentation timestamps. The media output data engine 150 coordinates with the video player 130 by providing current playback time for timestamp-based video frame drawing, thereby ensuring synchronized audio-visual output.

As will be understood by those of skill in the art, the video player 130, accessing the video buffer 132, includes or has access to a video player audio buffer 134, which stores the audio data that would typically be played with the data from the video buffer 132; as will also be understood, playing the audio data in the video player audio buffer 134 with audio data from another application (e.g., the second application 120) executing either on the same computing device 106 or on a second computing device (not shown) introduces delay. In contrast, the method 200 may include aligning, by the buffer synchronizer 111, data in the video player audio buffer 134 with the modified audio data from the sample processor 108 and directing, by the first application, synchronized playback of video data from a video buffer and the aligned audio data from the buffer synchronizer 111 in the media output engine 150. The method 200 may include aligning, by the first application, audio data within a video player audio buffer to have a sample start time that matches a sample start time of the non-empty buffer. As will be understood by those of skill in the art, a video frame rate (measured in frames per second) determines how many images are displayed in a second and an audio sample rate (measured in samples per second, or Hz) determines how many samples are played back in a second. Because there is such a high number of samples per second in audio data, audio samples are typically grouped into segments referred to as buffers, of a predetermined size, to reduce the number of callbacks (e.g., overhead) and increase throughput during playback. Since the video player audio buffer 134 includes time stamps that are linked to time stamps associated with video data from the video buffer 132, by time aligning the start positions with the matching buffer sizes of the audio data stream 110 and the video player audio buffer 134 in the buffer synchronizer 111, the audio data stream 110 will have the same time stamps that are associated with the video data. Receiving an audio data stream to which a signal with cycling higher than threshold amplitudes and lower than threshold amplitudes at each sample interval was added prior to streaming of the audio data stream 110 and analyzing the received audio data stream 110 to determine whether there is a cycle of very high and very low amplitudes allows the system 100 to initialize or maintain synchronized playback by aligning a sample in the video player audio buffer 134 with the sample from the sample processor 108 inside the buffer synchronizer 111 because the first application 102 uses either the higher than threshold amplitude or the lower than threshold amplitude to identify the start of the sample from the sample processor 108. This process repeats until the samples have filled the capacity of the audio buffers which are then transferred to the media output engine 150 for playback. Since the time resolution of an audio buffer is typically higher than that of a video frame, resulting in multiple audio buffers per video frame, the media output engine 150 may check one or more of the timestamps of the audio buffers to determine if a video frame needs to also be drawn (at that same time stamp). In the event that the video player audio buffer 134 had no data in it, the system 100 may create content for storage in the audio buffer 134 that is connected to the time stamps of the video buffer 132.

In some embodiments, in addition to initiating playback on the local computing device 106, the system 100 may transmit a copy of the video buffer data and synchronized audio buffer data to an encoder to encode all of the elements together in a package and stream the package to a web browser or another instance of the application 102. In one of these embodiments in which the package is streamed to a web browser, the web browser receives the full audiovisual stream as a package and decodes the package in the browser.

The method 200 may include repeating the process of analyzing portions of the audio data stream 110 to determine whether each portion includes the signal having the characteristics of a first amplitude in a first portion that exceeds a threshold level of amplitude followed by a second amplitude in a second portion that is lower than the threshold level of amplitude; in each instance in which the first application 102 determines that the audio data stream 110 includes such a signal, the sample processor 108 may remove that portion of the signal and the transport panel 112 may initiate or maintain playback of the video buffer 132 in synchronization with the audio data stream 110. Therefore, the method 200 may include determining, by the first application, that a third amplitude of a third portion of the at least one signal in the non-empty buffer of the audio data stream is higher than the threshold level of the first amplitude; determining, by the first application, that a frequency of the at least one signal in the non-empty buffer of the audio data stream is the same as (e.g., matches) a predetermined frequency; removing, by the first application, from the non-empty buffer, the third portion of the at least one signal, based upon the determined third amplitude and the determined frequency; and maintaining, by the first application, after the removal of the third portion of the at least one signal, synchronized playback of the audio data stream and of the video buffer.

For each portion of an audio data stream 110 that will be played in synchronization with a portion of a video buffer 132, the first application 102 may first analyze the portion of the audio data stream 110 to determine whether the audio data stream includes the non-empty buffer comprising the at least one signal and may continue to analyze received portions of the audio data stream to confirm that the received portions also include the at least one signal. Therefore, the first application 102 may determine that the at least one signal has a length that is the same as the length of a second signal in the audio data stream. Should a portion of the audio data stream 110 not include a portion of the signal having the specified amplitudes (one higher and one lower than a threshold level), the first application 102 may discontinue playback of both the audio data stream 110 and the video buffer 132.

The first application 102 may generate the signal. The first application 102 may generate the signal by creating an array of values that include values representing a pattern of alternating amplitudes-one amplitude that exceeds a threshold followed by one amplitude that is lower than the threshold. The first application 102 may populate the array of values with a pattern of alternating amplitudes that result in an ultrasonic sound. The first application 102 may transmit the signal to the second application 120. The first application 102 may transmit the signal to the second application 120 with an instruction to include the signal in any audio data streams that are to be played in synchronization with any other data. In this way, the first application 102 ensures that an audio data stream that is to be synchronized with other data for playback will include a signal having characteristics that allow the first application 102 to initiate the playback in synchronization with the other data. The first application 102 may provide the instruction regarding inclusion of the signal to the second application 120. The first application 102 may provide the instruction regarding inclusion of the signal to a user of the second application 120 with an instruction to include as many copies of the signal as is necessary to ensure that each portion of the audio data stream that is audible to humans is accompanied by a portion of the signal having the ultrasonic characteristics. In some embodiments, the first application 102 directs the installation of a plug-in to the second application 120 and the plug-in generates the signal for inclusion in the audio data stream 110. In other embodiments, the first application 102 generates a file representing the signal and includes the file in a package for importing to the second application 120 so that the file is available for inclusion in the audio data stream 110.

Figure 3:
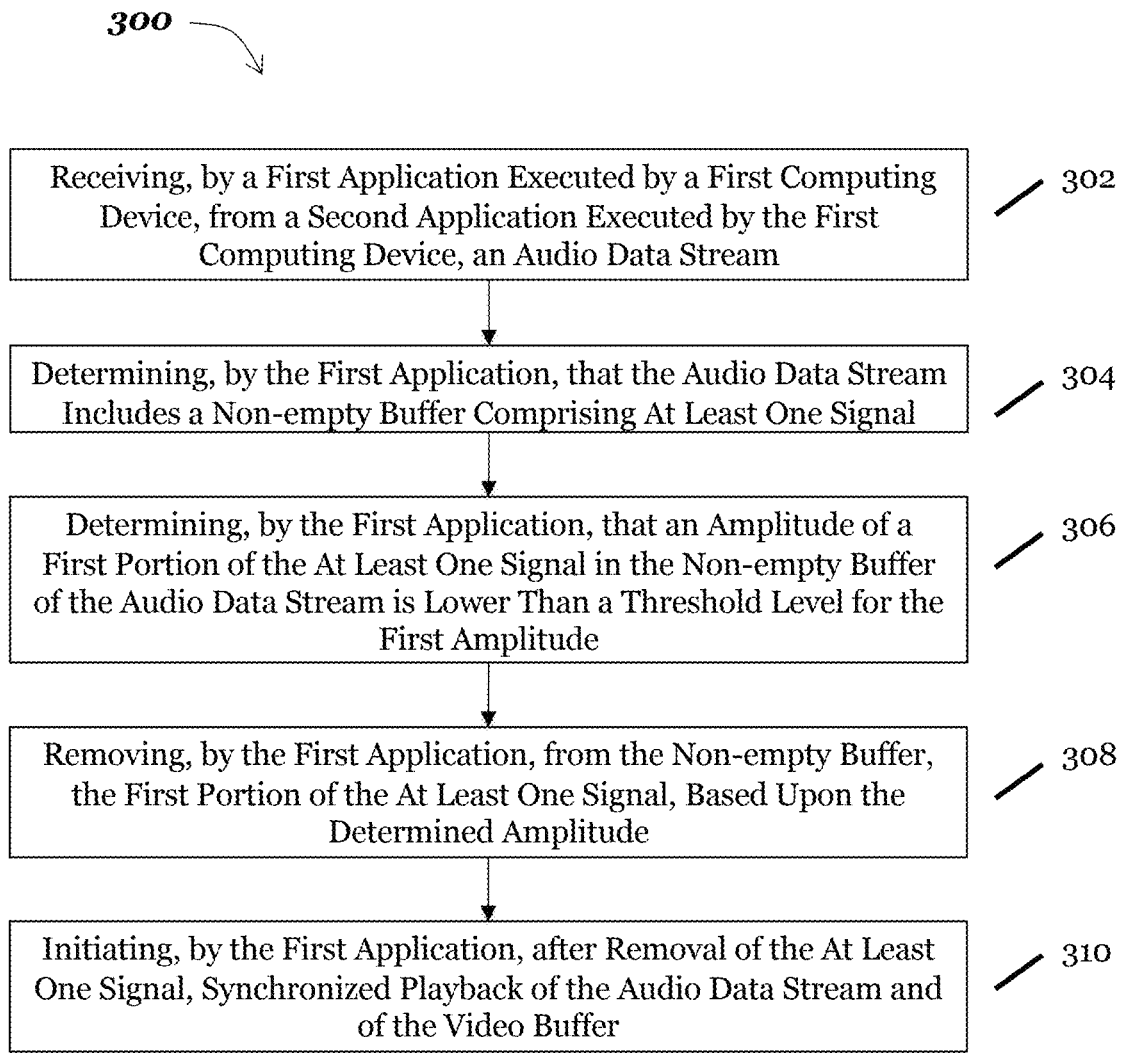
FIG. 3 is a flow diagram depicting an embodiment of a method for playback of at least one audio data stream synchronized with playback of at least one video buffer.

Although FIG. 2 described an embodiment in which the first application 102 determines that the amplitude of a first portion of the at least one signal in the non-empty buffer of the audio data stream is higher than a threshold level for the first amplitude in order to initiate synchronized playback, the system 100 may also execute a method in which the first application 102 determines that the amplitude of the first portion of the at least one signal in the non-empty buffer of the audio data stream is lower than a threshold level for the first amplitude, as will be described in connection with FIG. 3.

Referring now to FIG. 3, in brief overview, a block diagram depicts one embodiment of a method 300 for playback of at least one audio data stream synchronized with playback of at least one video buffer. The method 300 includes receiving, by a first application executed by a first computing device, from a second application executed by the first computing device, an audio data stream (302). The method includes determining, by the first application, that the audio data stream includes a non-empty buffer comprising at least one signal (304). The method includes determining, by the first application, that a first amplitude of a first portion of the at least one signal in the non-empty buffer of the audio data stream is lower than a threshold level for the first amplitude (306). The method includes removing, by the first application, from the non-empty buffer, the first portion of the at least one signal in the non-empty buffer, based upon the first amplitude (308). The method includes initiating, by the first application, after removal of the first portion of the at least one signal, synchronized playback of the audio data stream and of a video buffer (310).

Referring now to FIG. 3, in greater detail and in connection with FIGS. 1-2, the method 300 includes receiving, by a first application executed by a first computing device, from a second application executed by the first computing device, an audio data stream (302). The receiving may occur as described above in connection with FIG. 2 at (202).

The method 300 includes determining, by the first application, that the audio data stream includes a non-empty buffer comprising at least one signal (304). The determining may occur as described above in connection with FIG. 2 at (204).

The method 300 includes determining, by the first application, that a first amplitude of a first portion of the at least one signal in the non-empty buffer of the audio data stream is lower than a threshold level for the first amplitude (306).

Based upon determining that the first amplitude is lower than the threshold level for the first amplitude, the first application 102 may instruct the transport panel 112 to transmit data from the video player audio buffer 132 to the buffer synchronizer 111.

The method 300 includes removing, by the first application, from the non-empty buffer, the first portion of the at least one signal in the non-empty buffer, based upon the first amplitude (308). The removing may occur as described above in connection with FIG. 2 at (208).

The method 300 includes initiating, by the first application, after removal of the first portion of the at least one signal, synchronized playback of the audio data stream and of a video buffer (310). The initiating may occur as described above in connection with FIG. 2 at (210). In one embodiment, the first application 102 determines that a first portion of the signal includes a first amplitude that is lower than a threshold level of amplitude and, based upon that determination, the first application 102 may remove at least a portion of the signal; the determination of the low amplitude of the portion of the signal may trigger the first application 102 to initiate playback for a first portion of the audio data stream 110 and, simultaneously, to initiate playback of the video buffer 132.

After initiating playback, the first application 102 may proceed to analyze another portion of the audio data stream 110 to determine whether to maintain playback. Therefore, the first application 102 may determine that a second amplitude of a second portion of the at least one signal in the non-empty buffer of the audio data stream is higher than a threshold level of amplitude and the first application may determine that a frequency of the at least one signal in the non-empty buffer of the audio data stream is the same as (e.g., matches) a predetermined frequency. The first application 102 may then remove, from the non-empty buffer, the second portion of the at least one signal, based upon the determined second amplitude and the determined frequency and, upon completion of the removal, the first application 102 may maintain the synchronized playback of the audio data stream and of the video buffer; for example, the first application 102 may send an instruction to each of the video player 116 and the audio player 116 to continue playback.

The method 200 may include repeating the process of analyzing portions of the audio data stream 110 to determine whether each portion includes the signal having the characteristics of a first amplitude in a first portion that is lower than a threshold level of amplitude followed by a second amplitude in a second portion that is higher than the threshold level of amplitude; in each instance in which the first application 102 determines that the audio data stream 110 includes such a signal, the sample processor 108 may remove that portion of the signal and the transport panel 112 may initiate or maintain playback of the video buffer 132 in synchronization with the audio data stream 110. Therefore, the method 200 may include determining, by the first application 102, that a third amplitude of a third portion of the at least one signal in the non-empty buffer of the audio data stream is lower than the threshold level of the first amplitude; determining, by the first application, that a frequency of the at least one signal in the non-empty buffer of the audio data stream is the same as (e.g., matches) a predetermined frequency; removing, by the first application, from the non-empty buffer, the third portion of the at least one signal, based upon the determined third amplitude and the determined frequency; and maintaining, by the first application, after the removal of the third portion of the at least one signal, synchronized playback of the audio data stream and of the video buffer.

Figure 4A:
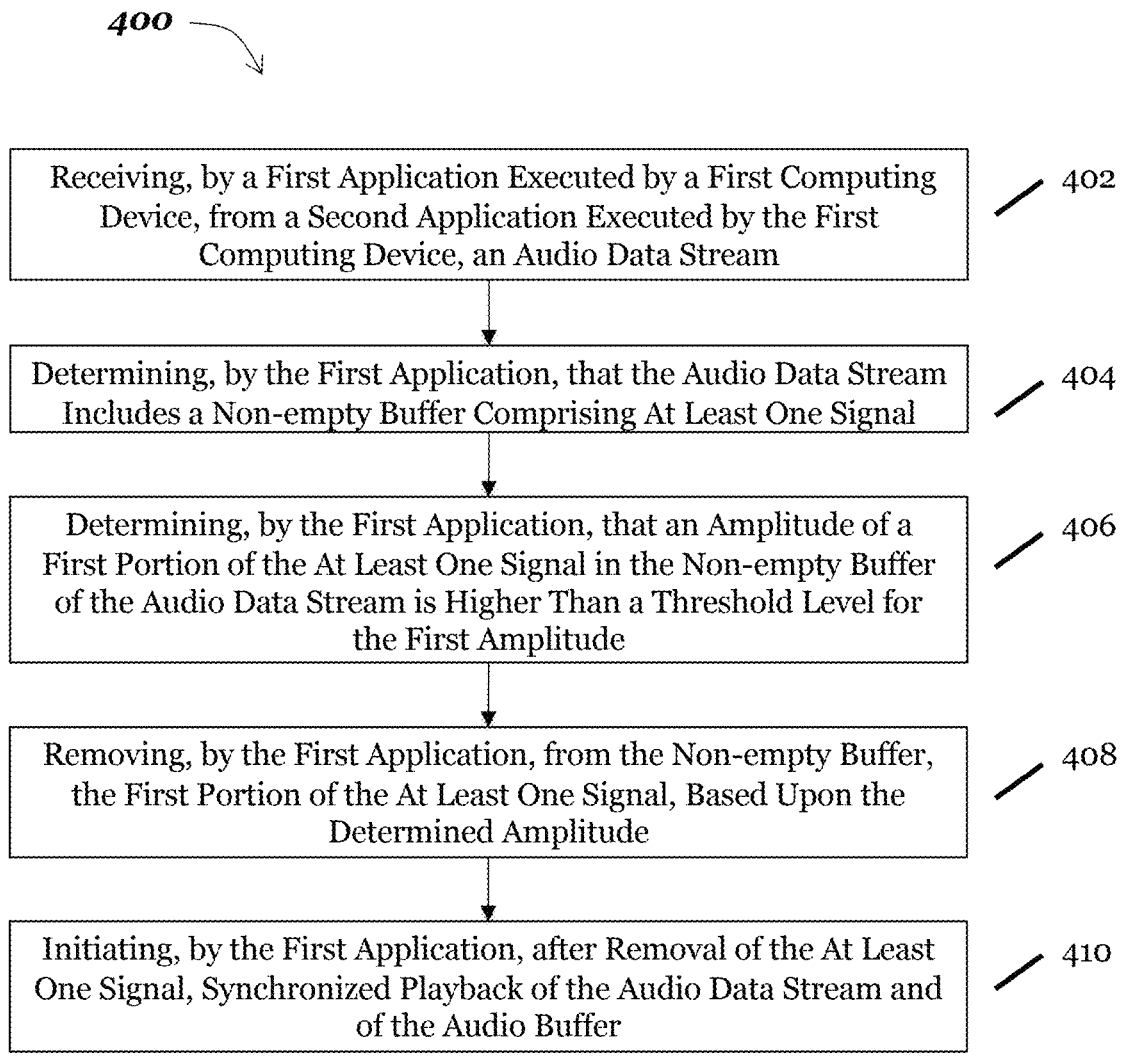
FIG. 4A is a flow diagram depicting an embodiment of a method for playback of at least one audio data stream synchronized with playback of at least one audio buffer.

Referring now to FIG. 4A, in brief overview, a block diagram depicts one embodiment of a method 400 for playback of at least one audio data stream synchronized with playback of at least one audio buffer. The method 400 includes receiving, by a first application executed by a first computing device, from a second application executed by the first computing device, an audio data stream (402). The method includes determining, by the first application, that the audio data stream includes a non-empty buffer comprising at least one signal (404). The method includes determining, by the first application, that a first amplitude of a first portion of the at least one signal in the non-empty buffer of the audio data stream is higher than a threshold level for the first amplitude (406). The method includes removing, by the first application, from the non-empty buffer, the first portion of the at least one signal in the non-empty buffer, based upon the first amplitude (408). The method includes initiating, by the first application, after removal of the first portion of the at least one signal, synchronized playback of the audio data stream and of an audio buffer (410).

Referring now to FIG. 4A, in greater detail and in connection with FIGS. 1-3. the method 400 includes receiving, by a first application executed by a first computing device, from a second application executed by the first computing device, an audio data stream (402). The receiving may occur as described above in connection with FIG. 2 at (202).

The method 400 includes determining, by the first application, that the audio data stream includes a non-empty buffer comprising at least one signal (404). The determining may occur as described above in connection with FIG. 2 at (204).

The method 400 includes determining, by the first application, that a first amplitude of a first portion of the at least one signal in the non-empty buffer of the audio data stream is higher than a threshold level for the first amplitude (406). The determining may occur as described above in connection with FIG. 2 at (206).

The method 400 includes removing, by the first application, from the non-empty buffer, the first portion of the at least one signal in the non-empty buffer, based upon the first amplitude (408). The removing may occur as described above in connection with FIG. 2 at (208).

The method 400 includes initiating, by the first application, after removal of the first portion of the at least one signal, synchronized playback of the audio data stream and of an audio buffer (410).

Figure 4B:
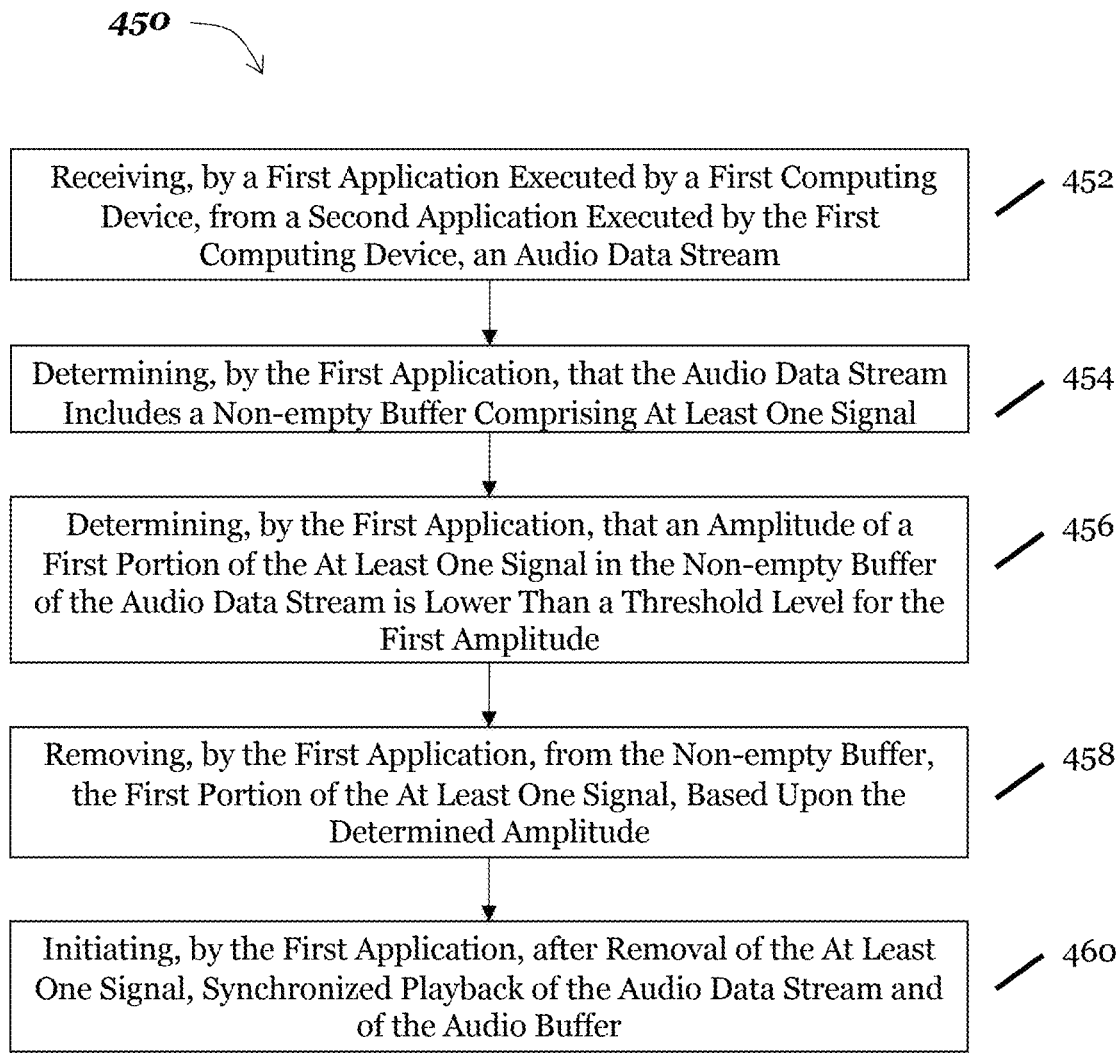
FIG. 4B is a flow diagram depicting an embodiment of a method for playback of at least one audio data stream synchronized with playback of at least one audio buffer.

Referring now to FIG. 4B, in brief overview, a block diagram depicts one embodiment of a method 450 for playback of at least one audio data stream synchronized with playback of at least one audio buffer. The method 450 includes receiving, by a first application executed by a first computing device, from a second application executed by the first computing device, an audio data stream (452). The method 450 includes determining, by the first application, that the audio data stream includes a non-empty buffer comprising at least one signal (454). The method 450 includes determining, by the first application, that a first amplitude of a first portion of the at least one signal in the non-empty buffer of the audio data stream is lower than a threshold level for the first amplitude (456). The method 450 includes removing, by the first application, from the non-empty buffer, the first portion of the at least one signal in the non-empty buffer, based upon the first amplitude (458). The method 450 includes initiating, by the first application, after removal of the first portion of the at least one signal, synchronized playback of the audio data stream and of an audio buffer (460).

Referring now to FIG. 4B, in greater detail and in connection with FIGS. 1B, 3, and 4A, the method 450 includes receiving, by a first application executed by a first computing device, from a second application executed by the first computing device, an audio data stream (452). The receiving may occur as described above in connection with FIG. 2 at (202).

The method 450 includes determining, by the first application, that the audio data stream includes a non-empty buffer comprising at least one signal (454). The determining may occur as described above in connection with FIG. 2 at (204).

The method 450 includes determining, by the first application, that a first amplitude of a first portion of the at least one signal in the non-empty buffer of the audio data stream is lower than a threshold level for the first amplitude (456). The determining may occur as described above in connection with FIG. 3 at (306).

The method 450 includes removing, by the first application, from the non-empty buffer, the first portion of the at least one signal in the non-empty buffer, based upon the first amplitude (458). The removing may occur as described above in connection with FIG. 2 at (208).

The method 450 includes initiating, by the first application, after removal of the first portion of the at least one signal, synchronized playback of the audio data stream and of an audio buffer (460). The initiating may occur as described above in connection with FIG. 4A at (410).

In some embodiments, the system 100 includes non-transitory, computer-readable medium comprising computer program instructions tangibly stored on the non-transitory computer-readable medium, wherein the instructions are executable by at least one processor to perform any of the methods described above in connection with FIGS. 2, 3, 4A, and 4B.

It should be understood that the systems described above may provide multiple ones of any or each of those components and these components may be provided on either a standalone machine or, in some embodiments, on multiple machines in a distributed system. The phrases 'in one embodiment,' 'in another embodiment,' and the like, generally mean that the particular feature, structure, step, or characteristic following the phrase is included in at least one embodiment of the present disclosure and may be included in more than one embodiment of the present disclosure. Such phrases may, but do not necessarily, refer to the same embodiment. However, the scope of protection is defined by the appended claims; the embodiments mentioned herein provide examples.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C#, JAVA, SCALA, PYTHON, TYPESCRIPT, or any compiled or interpreted programming language.

Each such computer program may be implemented in a computer program product tangibly embodied in a machine-readable storage device for execution by a computer processor. Method steps may be performed by a computer processor executing a program tangibly embodied on a computer-readable medium to perform functions of the methods and systems described herein by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data (including, for example, instructions for storage on non-transitory computer-readable media) from a second computer providing access to the programs via a network transmission line, wireless transmission media, signals propagating through space, radio waves, infrared signals, etc.

Figure 5A:
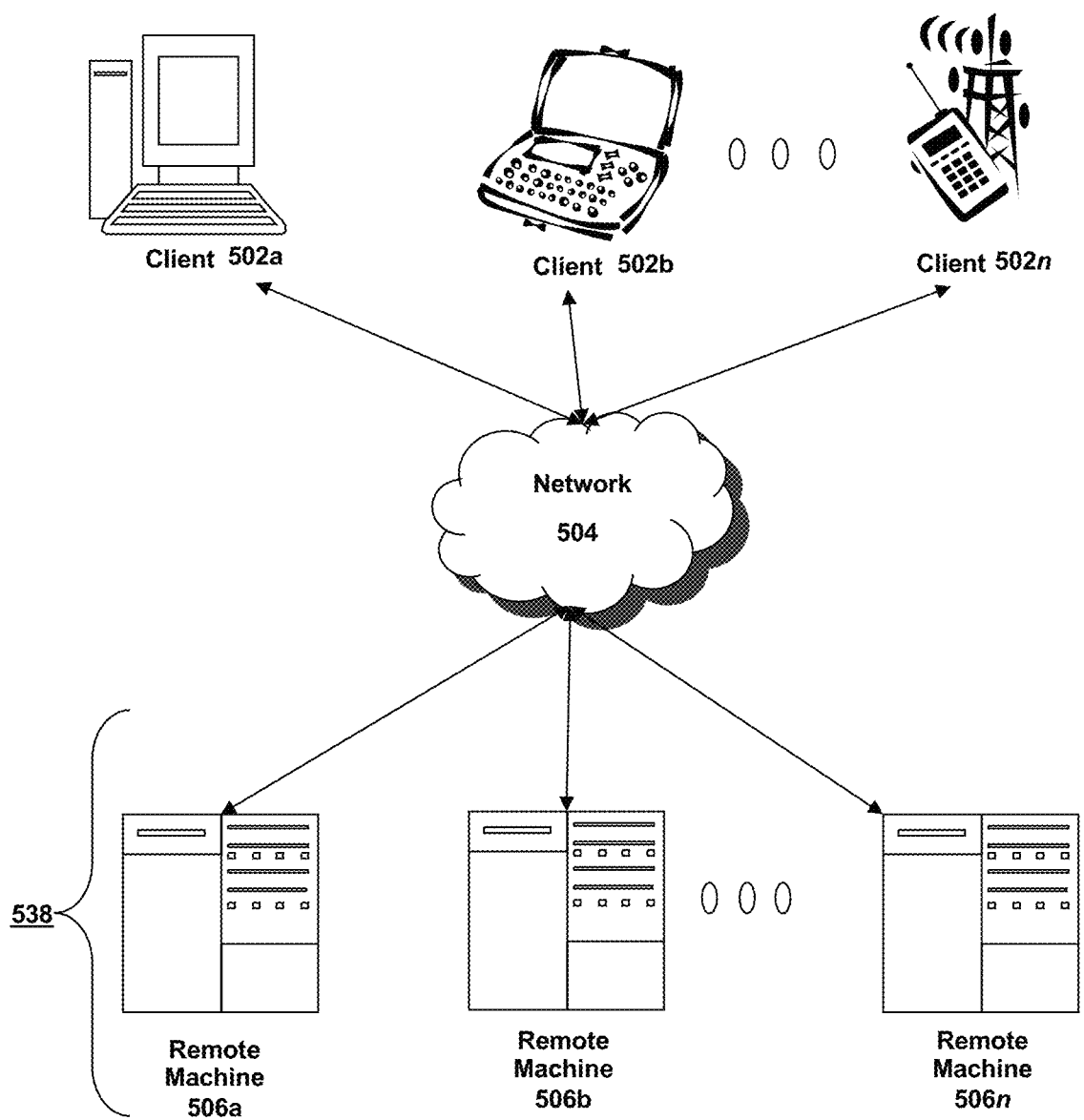
FIGS. 5A-5C are block diagrams depicting embodiments of computers useful in connection with the methods and systems described herein.
Figure 5B:
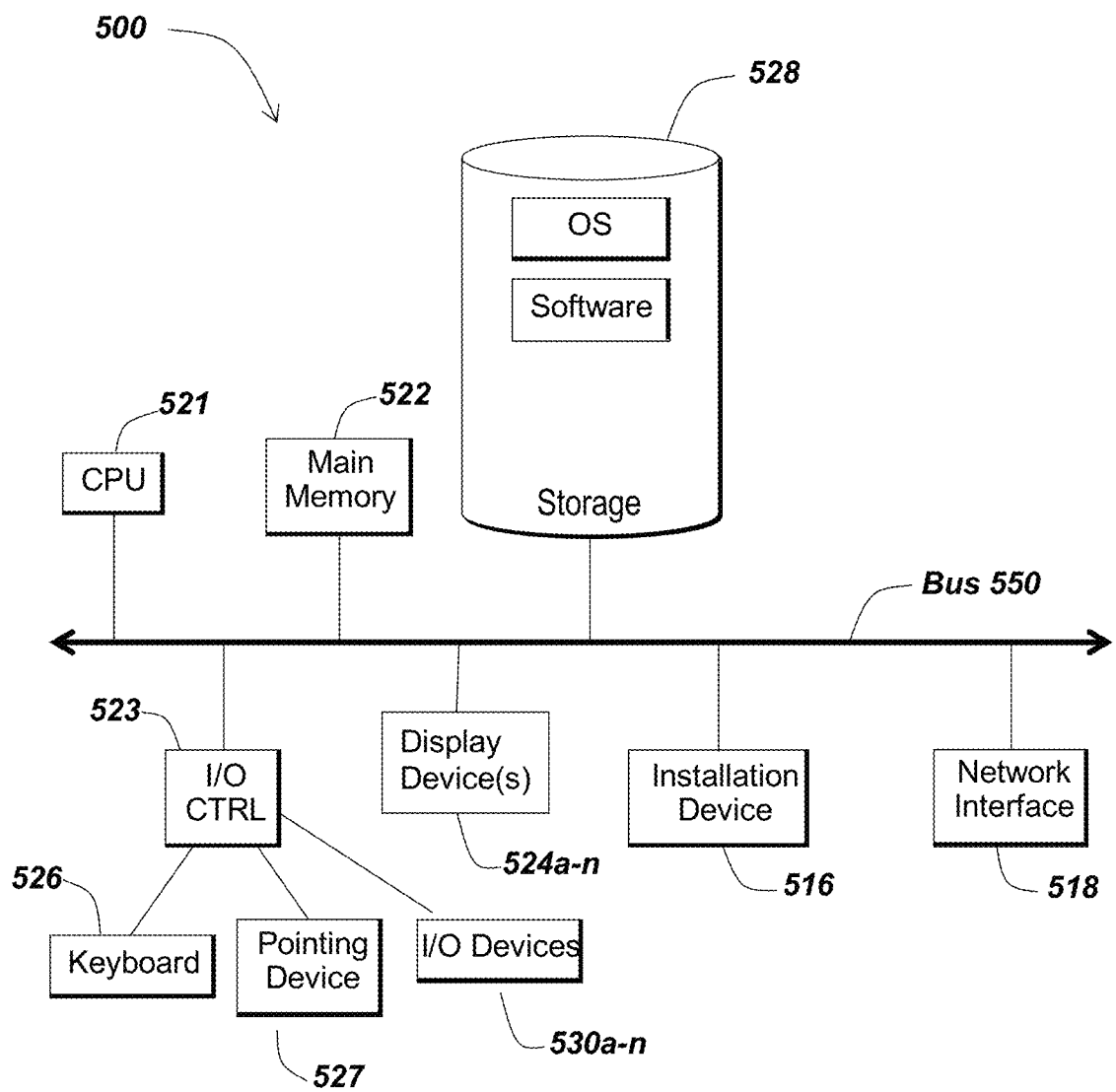
Figure 5C:
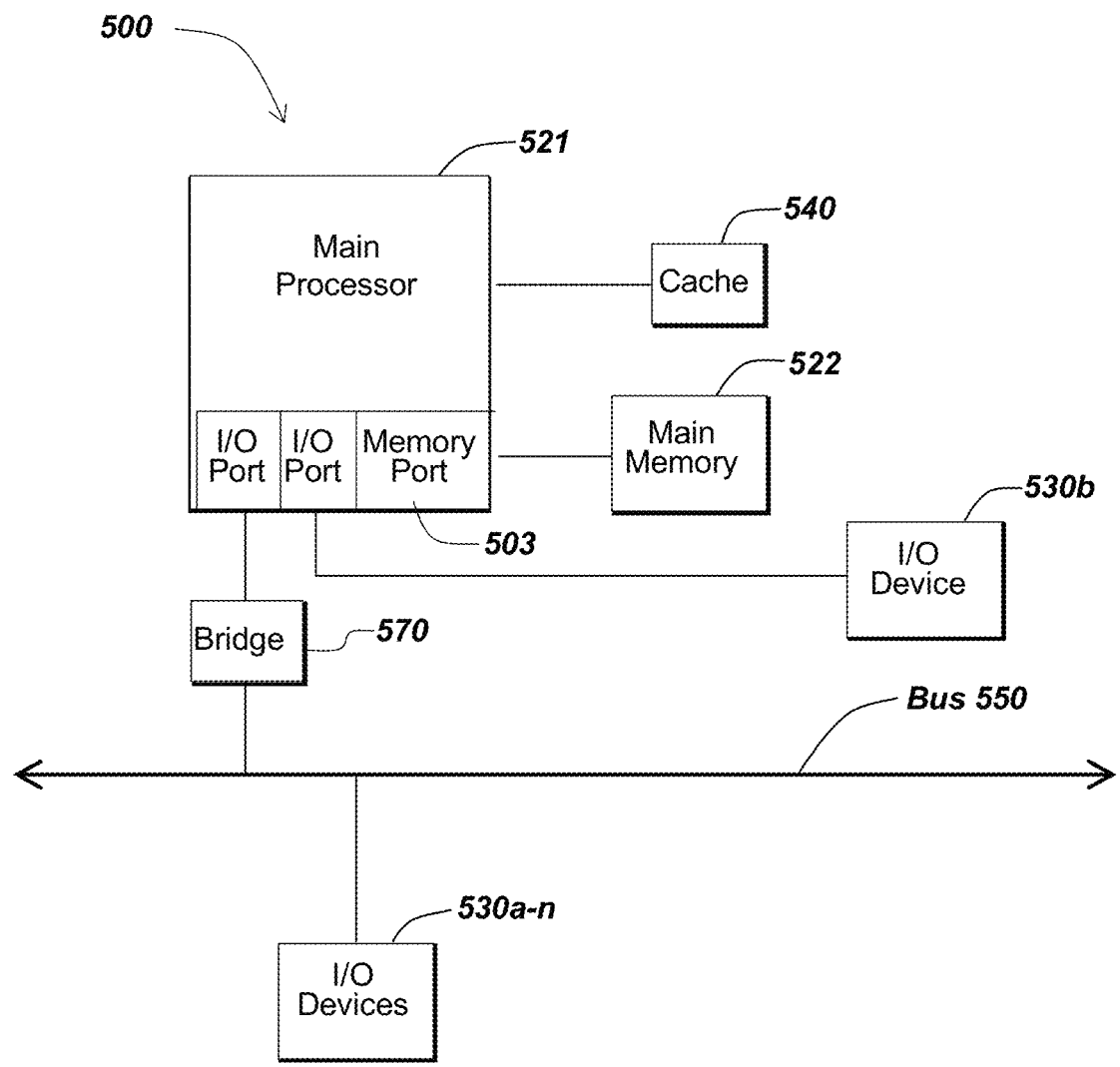

Referring now to FIGS. 5A, 5B, and 5C, block diagrams depict additional detail regarding computing devices that may be modified to execute novel, non-obvious functionality for implementing the methods and systems described above.

Referring now to FIG. 5A, an embodiment of a network environment is depicted. In brief overview, the network environment comprises one or more clients 502a-502n (also generally referred to as local machine(s) 502, client(s) 502, client node(s) 502, client machine(s) 502, client computer(s) 502, client device(s) 502, computing device(s) 502, endpoint(s) 502, or endpoint node(s) 502) in communication with one or more remote machines 506a-506n (also generally referred to as server(s) 506 or computing device(s) 506) via one or more networks 504.

Although FIG. 5A shows a network 504 between the clients 502 and the remote machines 506, the clients 502 and the remote machines 506 may be on the same network 504. The network 504 can be a local area network (LAN), such as a company Intranet, a metropolitan area network (MAN), or a wide area network (WAN), such as the Internet or the World Wide Web. In some embodiments, there are multiple networks 504 between the clients 502 and the remote machines 506. In one of these embodiments, a network 504' (not shown) may be a private network and a network 504 may be a public network. In another of these embodiments, a network 504 may be a private network and a network 504' a public network. In still another embodiment, networks 504 and 504' may both be private networks. In yet another embodiment, networks 504 and 504' may both be public networks.

The network 504 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, and a wireline network. In some embodiments, the network 504 may comprise a wireless link, such as an infrared channel or satellite band. The topology of the network 504 may be a bus, star, or ring network topology. The network 504 may be of any such network topology as known to those ordinarily skilled in the art capable of supporting the operations described herein. The network 504 may comprise mobile telephone networks utilizing any protocol or protocols used to communicate among mobile devices (including tables and handheld devices generally), including AMPS, TDMA, CDMA, GSM, GPRS, UMTS, or LTE. In some embodiments, different types of data may be transmitted via different protocols. In other embodiments, the same types of data may be transmitted via different protocols.

A client 502 and a remote machine 506 (referred to generally as computing devices 500) can be any workstation, desktop computer, laptop or notebook computer, server, portable computer, mobile telephone, mobile smartphone, or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client 502 may execute, operate or otherwise provide an application, which can be any type and/or form of software, program, or executable instructions, including, without limitation, any type and/or form of web browser, web-based client, client-server application, or any other type and/or form of executable instructions capable of executing on client 502.

In one embodiment, a computing device 506 provides functionality of a web server. The web server may be any type of web server, including web servers that are open-source web servers, web servers that execute proprietary software, and cloud-based web servers where a third party hosts the hardware executing the functionality of the web server. In some embodiments, a web server 506 comprises an open-source web server, such as the APACHE servers maintained by the Apache Software Foundation of Delaware. In other embodiments, the web server executes proprietary software, such as the INTERNET INFORMATION SERVICES products provided by Microsoft Corporation of Redmond, WA, the APACHE HTTP SERVER, developed and maintained by the Apache Software Foundation of Forest Hill, MD, the NGINX and NGINX Plus products provided by F5 Networks of Seattle, WA, and any other type of web server.

In some embodiments, the system may include multiple, logically-grouped remote machines 506. In one of these embodiments, the logical group of remote machines may be referred to as a server farm 538. In another of these embodiments, the server farm 538 may be administered as a single entity.

FIGS. 5B and 5C depict block diagrams of a computing device 500 useful for practicing an embodiment of the client 502 or a remote machine 506. As shown in FIGS. 5B and 5C, each computing device 500 includes a central processing unit 521, and a main memory unit 522. As shown in FIG. 5B, a computing device 500 may include a storage device 528, an installation device 516, a network interface 518, an I/O controller 523, display devices 524a-n, a keyboard 526, a pointing device 527, such as a mouse, and one or more other I/O devices 530a-n. The storage device 528 may include, without limitation, an operating system and software. As shown in FIG. 5C, each computing device 500 may also include additional optional elements, such as a memory port 503, a bridge 570, one or more input/output devices 530a-n (generally referred to using reference numeral 530), and a cache memory 540 in communication with the central processing unit 521.

The central processing unit 521 is any logic circuitry that responds to, and processes instructions fetched from, the main memory unit 522. In many embodiments, the central processing unit 521 is provided by a microprocessor unit, such as: those manufactured by Intel Corporation of Mountain View, CA; those manufactured by Motorola Corporation of Schaumburg, IL; those manufactured by Transmeta Corporation of Santa Clara, CA; those manufactured by International Business Machines of White Plains, NY; or those manufactured by Advanced Micro Devices of Sunnyvale, CA. Other examples include SPARC processors, ARM processors, processors used to build UNIX/LINUX "white" boxes, and processors for mobile devices. The computing device 500 may be based on any of these processors, or any other processor capable of operating as described herein.

Main memory unit 522 may be one or more memory chips capable of storing data and allowing any storage location to be directly accessed by the microprocessor 521. The main memory 522 may be based on any available memory chips capable of operating as described herein. In the embodiment shown in FIG. 5B, the processor 521 communicates with main memory 522 via a system bus 550. FIG. 5C depicts an embodiment of a computing device 500 in which the processor communicates directly with main memory 522 via a memory port 503. FIG. 5C also depicts an embodiment in which the main processor 521 communicates directly with cache memory 540 via a secondary bus, sometimes referred to as a backside bus. In other embodiments, the main processor 521 communicates with cache memory 540 using the system bus 550.

In the embodiment shown in FIG. 5B, the processor 521 communicates with various I/O devices 530 via a local system bus 550. Various buses may be used to connect the central processing unit 521 to any of the I/O devices 530, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 524, the processor 521 may use an Advanced Graphics Port (AGP) to communicate with the display 524. FIG. 5C depicts an embodiment of a computing device 500 in which the main processor 521 also communicates directly with an I/O device 530b via, for example, HYPERTRANSPORT, RAPIDIO, or INFINI-BAND communications technology.

One or more of a wide variety of I/O devices 530a-n may be present in or connected to the computing device 500, each of which may be of the same or different type and/or form. Input devices include keyboards, mice, trackpads, trackballs, microphones, scanners, cameras, and drawing tablets. Output devices include video displays, speakers, inkjet printers, laser printers, 3D printers, and dye-sublimation printers. The I/O devices may be controlled by an I/O controller 523 as shown in FIG. 5B. Furthermore, an I/O device may also provide storage and/or an installation medium 516 for the computing device 500. In some embodiments, the computing device 500 may provide USB connections (not shown) to receive handheld USB storage devices such as the USB Flash Drive line of devices manufactured by Twintech Industry, Inc. of Los Alamitos, CA.

Referring still to FIG. 5B, the computing device 500 may support any suitable installation device 516, such as a CD-ROM drive; a CD-R/RW drive; a DVD-ROM drive; tape drives of various formats; a USB device; a hard-drive or any other device suitable for installing software and programs. In some embodiments, the computing device 500 may provide functionality for installing software over a network 504. The computing device 500 may further comprise a storage device, such as one or more hard disk drives or redundant arrays of independent disks, for storing an operating system and other software. Alternatively, the computing device 500 may rely on memory chips for storage instead of hard disks.

Furthermore, the computing device 500 may include a network interface 518 to interface to the network 504 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, Bluetooth, ZIGBEE, CDMA, GSM, WiMax, and direct asynchronous connections). In one embodiment, the computing device 500 communicates with other computing devices 500' via any type and/or form of gateway or tunneling protocol such as Secure Socket Layer (SSL) or Transport Layer Security (TLS). The network interface 518 may comprise a built-in network adapter, network interface card, PCMCIA network card, card bus network adapter, wireless network adapter, USB network adapter, modem, or any other device suitable for interfacing the computing device 500 to any type of network capable of communication and performing the operations described herein.

In further embodiments, an I/O device 530 may be a bridge between the system bus 550 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 500 of the sort depicted in FIGS. 5B and 5C typically operates under the control of operating systems, which control scheduling of tasks and access to system resources. The computing device 500 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 95, WINDOWS 98, WINDOWS 2000, WINDOWS NT, WINDOWS CE, WINDOWS XP, WINDOWS 7 through 11, and WINDOWS VISTA, all of which are manufactured by Microsoft Corporation of Redmond, WA; MAC OS manufactured by Apple Inc. of Cupertino, CA; OS/2 manufactured by International Business Machines of Armonk, NY; Red Hat Enterprise Linux, a Linux-variant operating system distributed by Red Hat, Inc., of Raleigh, NC; Ubuntu, a freely-available operating system distributed by Canonical Ltd. of London, England; or any type and/or form of a Unix operating system, among others.

Having described certain embodiments of methods and systems for playback of at least one audio data stream synchronized with playback of at least one video buffer, it will be apparent to one of skill in the art that other embodiments incorporating the concepts of the disclosure may be used.

What is claimed is:

1. A method for playback of at least one audio data stream synchronized with playback of at least one video buffer, the method comprising:
  (a) receiving, by a first application executed by a first computing device, from a second application executed by the first computing device, an audio data stream;
  (b) determining, by the first application, that the audio data stream includes a non-empty buffer comprising at least one signal;
  (c) determining, by the first application, that a first amplitude of a first portion of the at least one signal in the non-empty buffer of the audio data stream is higher than a threshold level for the first amplitude;

(d) removing, by the first application, from the non-empty buffer, the first portion of the at least one signal in the non-empty buffer, based upon the first amplitude; and (e) initiating, by the first application, after (d), synchronized playback of the audio data stream and of a video buffer.

2. The method of claim 1, wherein (e) further comprises initiating, by the first application, after (d), synchronized playback of the audio data stream and of a video buffer, wherein the video buffer is stored on the first computing device.

3. The method of claim 1, wherein (e) further comprises initiating, by the first application, after (d), synchronized playback of the audio data stream and of the video buffer, wherein the video buffer is stored on a second computing device.

4. The method of claim 1, wherein (e) further comprises initiating, by the first application, after (d), synchronized playback of the audio data stream and of the video buffer, responsive to receiving, from a second computing device, an instruction to initiate synchronized playback.

5. The method of claim 1 further comprising:
(f) transmitting, by the first computing device, to a second computing device, an audiovisual data stream providing synchronized playback of the audio data stream and of the video buffer.

6. The method of claim 1 further comprising:
(f) determining, by the first application, that a second amplitude of a second portion of the at least one signal in the non-empty buffer of the audio data stream is lower than a threshold level of amplitude;
(g) determining, by the first application, that a frequency of the at least one signal in the non-empty buffer of the audio data stream is the same as a predetermined frequency;
(h) removing, by the first application, from the non-empty buffer, the second portion of the at least one signal, based upon the determined second amplitude and the determined frequency; and
(i) maintaining, by the first application, after (h), synchronized playback of the audio data stream and of the video buffer.

7. The method of claim 6 further comprising:
(j) determining, by the first application, that a third amplitude of a third portion of the at least one signal in the non-empty buffer of the audio data stream is higher than the threshold level of the first amplitude;
(k) determining, by the first application, that a frequency of the at least one signal in the non-empty buffer of the audio data stream is the same as a predetermined frequency;
(l) removing, by the first application, from the non-empty buffer, the third portion of the at least one signal, based upon the determined third amplitude and the determined frequency; and
(m) maintaining, by the first application, after (1), synchronized playback of the audio data stream and of the video buffer.

8. The method of 6, wherein (f) further comprises determining, by the first application, that the audio data stream includes the non-empty buffer comprising the at least one signal, wherein the at least one signal has a length that is the same as the length of a second signal in the audio data stream.

9. The method of claim 1 further comprising:
(f) aligning, by the first application, audio data within a video player audio buffer to match a sample start time of the non-empty buffer; and
(g) directing, by the first application, synchronized playback of video data from a video buffer and the modified audio data from the video player audio buffer.

10. A method for playback of at least one audio data stream synchronized with playback of at least one video buffer, the method comprising:
(a) receiving, by a first application executed by a first computing device, from a second application executed by the first computing device, an audio data stream;
(b) determining, by the first application, that the audio data stream includes a non-empty buffer comprising at least one signal;
(c) determining, by the first application, that a first amplitude of a first portion of the at least one signal in the non-empty buffer of the audio data stream is lower than a threshold level for the first amplitude;
(d) removing, by the first application, from the non-empty buffer, the first portion of the at least one signal in the non-empty buffer, based upon the first amplitude; and
(e) initiating, by the first application, after (d), synchronized playback of the audio data stream and of a video buffer.

11. The method of claim 10, wherein (e) further comprises initiating, by the first application, after (d), synchronized playback of the audio data stream and of a video buffer, wherein the video buffer is stored on the first computing device.

12. The method of claim 10, wherein (e) further comprises initiating, by the first application, after (d), synchronized playback of the audio data stream and of the video buffer, wherein the video buffer is stored on a second computing device.

13. The method of claim 10, wherein (e) further comprises initiating, by the first application, after (d), synchronized playback of the audio data stream and of the video buffer, responsive to receiving, from a second computing device, an instruction to initiate synchronized playback.

14. The method of claim 10 further comprising:
(f) transmitting, by the first computing device, to a second computing device, an audiovisual data stream providing synchronized playback of the audio data stream and of the video buffer.

15. The method of claim 10 further comprising:
(f) determining, by the first application, that a second amplitude of a second portion of the at least one signal in the non-empty buffer of the audio data stream is higher than a threshold level of amplitude;
(g) determining, by the first application, that a frequency of the at least one signal in the non-empty buffer of the audio data stream is the same as a predetermined frequency;
(h) removing, by the first application, from the non-empty buffer, the second portion of the at least one signal, based upon the determined second amplitude and the determined frequency; and
(i) maintaining, by the first application, after (i), synchronized playback of the audio data stream and of the video buffer.

16. The method of claim 15 further comprising:
(j) determining, by the first application, that a third amplitude of a third portion of the at least one signal in the non-empty buffer of the audio data stream is lower than the threshold level of the first amplitude;

(k) determining, by the first application, that the frequency of the at least one signal in the non-empty buffer of the audio data stream is the same as the predetermined frequency;
(l) removing, by the first application, from the non-empty buffer, the third portion of the at least one signal, based upon the determined third amplitude and the determined frequency; and
(m) maintaining, by the first application, after (p), synchronized playback of the audio data stream and of the video buffer.

17. The method of 15, wherein (f) further comprises determining, by the first application, that the audio data stream includes the non-empty buffer comprising the at least one signal, wherein the at least one signal has a length that is the same as the length of a second signal in the audio data stream.

18. The method of claim 10 further comprising:
(f) aligning, by the first application, audio data within a video player audio buffer to have a sample start time that matches a sample start time of the non-empty buffer; and
(g) directing, by the first application, synchronized playback of video data from a video buffer and the modified audio data from the video player audio buffer.

* * * * *